Dec. 23, 1969  R. A. SCOTT ET AL  3,485,215

FEEDING DEVICE

Original Filed Oct. 23, 1965  6 Sheets-Sheet 1

INVENTORS
Robert A. Scott
Richard R. Reese
David A. Scott by
ATTORNEYS

Dec. 23, 1969         R. A. SCOTT ET AL         3,485,215
                         FEEDING DEVICE

Original Filed Oct. 23, 1965                6 Sheets-Sheet 5

INVENTORS,
Robert A. Scott
Richard R. Reese
David A. Scott
by Edwin E. Greigg
ATTORNEY

INVENTOR,
Robert A. Scott
Richard R. Reese
by David A. Scott
ATTORNEY

INVENTORS,
Robert A. Scott
Richard R. Reese
David A. Scott

United States Patent Office 3,485,215
Patented Dec. 23, 1969

1

3,485,215
FEEDING DEVICE
Robert A. Scott, Richard R. Reese, and David A. Scott, Westminster, Md., assignors to Beacon Steel Products Company, Inc., Westminster, Md., a corporation of Maryland
Original application Oct. 23, 1965, Ser. No. 503,008, now Patent No. 3,330,255, dated July 11, 1967. Divided and this application May 11, 1967, Ser. No. 647,286
Int. Cl. A01k 5/02
U.S. Cl. 119—51.11
6 Claims

ABSTRACT OF THE DISCLOSURE

A feeder utilizing a horizontally disposed feed line having a supply hopper and spaced openings defining feeding stations. The feed supply line is provided with a switch responsive to feed input from the hopper to cause a motor for conveying feed along the feed line to deenergize in response to a build-up of feed in the feed line. The switch is connected to a timing circuit to cause the motor to be energized at predetermined intervals.

---

This application is a divisional application of our co-pending application Ser. No. 503,008, filed Oct. 23, 1965, entitled "Feeding Device."

The present invention relates generally to feeding devices and more particularly to an automatic poultry feeder for distributing feed to a plurality of feed stations.

One of the most persistent problems facing poultry farmers is the controlling of distribution of feed in a manner which would provide a continuous supply of fresh, clean feed of uniform mixtures to all areas of a poultry house and which would insure that the birds will consume the complete ration as mixed without picking out the preferred feed material. In this regard, chain and trough type feeders in which the feed material is moved along the trough from a main hopper have generally been found to be inadequate.

In chain and trough type feeders in which the feed material is distributed from a main hopper along an open trough extending the length of the poultry house, the birds rush to the supply end of the feed as the feeding process is initiated and the resulting crowding often results in injuries to the birds. Further, the birds eating from the trough closest to the supply end consume the feed particles of their choice, leaving the picked over material, generally of lesser nutritional value, for the birds eating further away from the supply end.

Attempts to overcome these problems have led to the development of a variety of mechanical poultry feeders such as shown, for example, in U.S. Reissue Patent No. 25,589. In this patent, the poultry feeder includes a main feed hopper having a feed line connected thereto with an internally positioned, open center, motor driven auger helix. The feed line is provided with a purality of spaced openings below which are supported feed pans so that as the auger is driven, the feed is carried along the feed line and falls through the spaced openings into the feed pan. This arrangement does not have the versatility of the mechanism to be disclosed herein and does not teach occasional feeding of the birds since in the prior device feed is deposited successively in the feed pans as the feed is conveyed along the conveyor and thus does not overcome

2 the problem of bird crowding at the supply end of the conveyor since the feeding station nearest the hopper always receives a full supply of feed first. Further, the new improvements to be disclosed herein provide an on-off switch which is not dependent upon the birds eating from a control station. Moreover, a further advantage of the new feeder contemplates a combination ceiling and floor supporting means which is particularly desirable since such an arrangement relieves stress from the overhead support means when the device is full of feed.

These and other disadvantages of prior art feeding devices are overcome by the present invention which has as its primary object of one of the embodiments the provision of an improved feeder which will provide fresh clean feed of uniform mixtures to all feeding stations or areas along the length of the feeder, and which will make feed available to the birds at all feeding stations in the poultry house at the same time.

Another object of the present invention is to provide an improved feeder for distributing equal quantities of feed to a plurality of feed stations simultaneously.

A further object of the present invention is to provide an improved feeder wherein the total amount of feed delivered to each feeder station is regulated.

Yet another object of the present invention is to provide in an embodiment an improved feeder wherein the feed material is conveyed to a plurality of feeding stations without being exposed to the birds until all feed stations are ready to be filled.

Still another object of the present invention is to provide in one of the embodiments an automatic feed conveyor for distributing equal quantities of feed material to a plurality of feed stations at timed intervals.

To this end, the feeding device of the present invention comprises a feed hopper connected to a feed supply line which extends horizontally therefrom and supports a conveying means such as, for example, an open center axially expandable helical auger. The feed supply line is provided with a plurality of openings at selective intervals and below each opening is supported a feeding pan. Each opening is maintained closed as the feed is being carried by the conveying means through the feed supply line away from the feed hopper, but is open when the direction of movement of the conveying means is reversed.

In accordance with one feature of the invention, the conveying means is an open center helical auger which is driven in one direction for conveying feed along the feed supply line prior to distribution to the several feed stations and in the reverse direction for distributing the feed to the several feed stations, the movement of the auger in the second direction serving to open the feed supply line at the several feed stations, and movement of the auger in the first direction serving to close the feed supply to the several feed stations.

In accordance with another feature of the invention, the feed supply line is provided with a switch responsive to the feed input from the hopper so as to cause the helical auger to stop automatically before reversing its direction to effect distribution of the feed to the feed stations. Advantageously, the switch may be connected as part of a timing circuit to cause the feed to be distributed to the feeding stations at predetermined intervals.

Other features and advantages of the present invention will become apparent from the following description taken in connection with the accompanying drawings; however, it is to be expressly understood that these drawings are for the purpose of illustration only and are not intended to represent the full scope of the invention which is defined by the appended claims.

In the drawings, wherein like characters refer to like parts throughout the several views.

Figure 1:
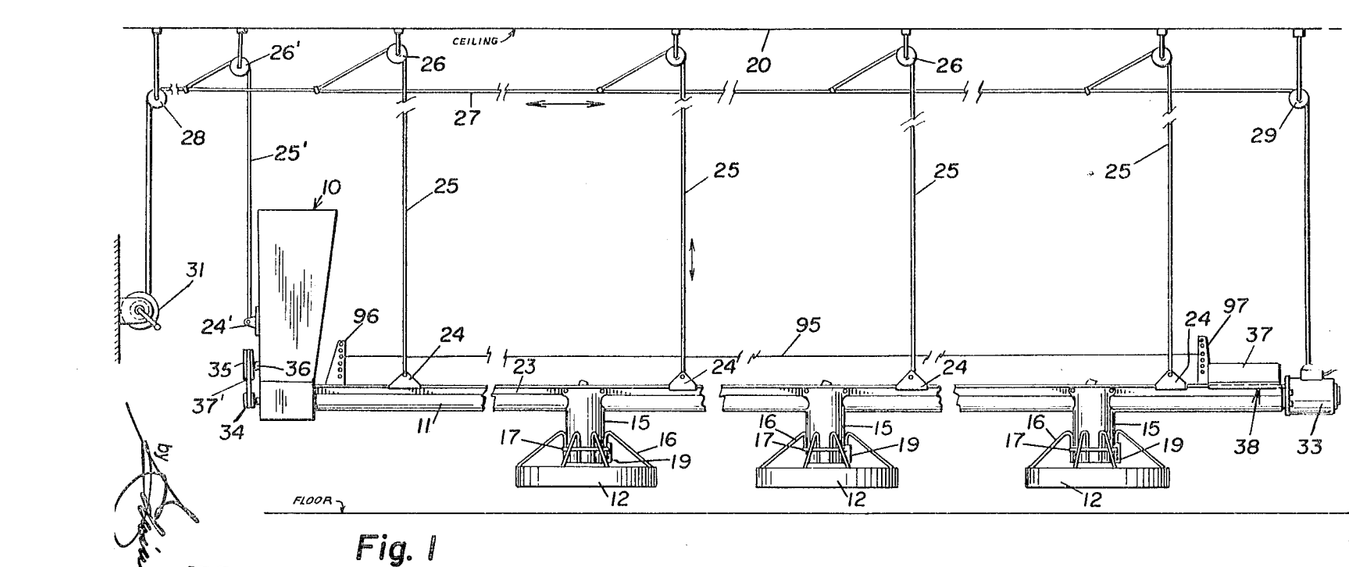
FIG. 1 is a side elevational view of a feed supply device embodying the present invention.

Referring now to the drawings, and in particular to FIG. 1, there is generally indicated at 10 a feed hopper from which feed is conveyed to a horizontally disposed feed line 11 arranged to extend along the length of a poultry house. Feed hopper 10 may be positioned within the feed room of the poultry house or may be located in an adjacent room, in which case feed line 11 necessarily extends through the separating wall (not shown). The latter arrangement is particularly advantageous since it permits loading of the feed hopper 10 without the annoyance of having the birds flocking around the feed hopper as it is being filled.

Spaced at fixed intervals along the feed line 11 and supported beneath the feed line are a plurality of feed pans 12 which form individual feeding stations for the birds. As more clearly shown in FIGS. 2 and 3, each feed pan 12 is circular in shape and has a centrally raised base portion 13, preferably conical in shape, to facilitate diffusion of the feed against the side wall 14 of the feed pan.

Figure 2:
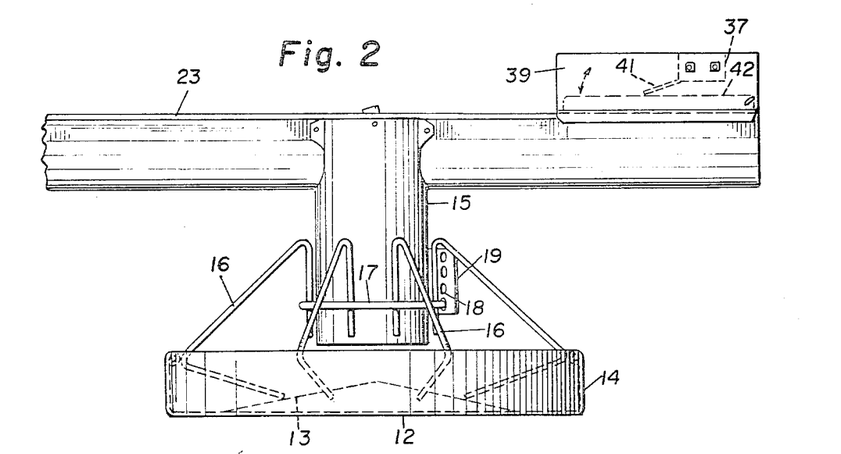
FIG. 2 is a fragmentary, side elevational view of the last feed station shown in FIG. 1.

Each feed pan 12 is supported beneath an opening in the feed line 11 at each feed station by a hollow, vertically disposed feed guide 15 conveniently attached at its upper end to feed line 11. For supporting the feed pan to the feed line, a plurality of spaced rod members 16 may be used as shown in FIG. 2. This arrangement prevents the birds from climbing into the feed pan, while allowing feed to be extracted therefrom. Rod members 16 are affixed at opposite ends between the feed pan 12 and the feed guide 15. Conveniently, one end of each rod member 16 may be bent downwardly to bear against the feed guide 15, and a circular rod member 17 may be positioned over the bent end portions of each rod member and positioned in one of a plurality of spaced openings 18 provided in a vertical plate 19 attached to the outside surface of the feed guide 15.

In this manner, the feed pan 12 may be spaced from the bottom of the feed guide 15 at suitable distances which is particularly desirable when feeding chicks. With the rod member 17 positioned in the uppermost opening 18, the feed pan 12 is disposed closely adjacent the bottom of the feed guide 15 and prevents any chicks which might make their way into the feed pan from getting hung-up and injured within the guide. It should be apparent that the feed pans may be of any desired form or if desired, as a matter of economy, the feed pans may be dispensed with entirely.

Referring again to FIG. 1, the entire feed system may be suspended from the ceiling 20 of the poultry house. To this end, the feed line 11 comprises a lower section which is generally circular in cross-section and a vertically extending upper section bent outwardly at right angles forming spaced top pieces 21 and 22, as more clearly shown in FIG. 6, to provide a trackway 23. Affixed to the trackway 23 at spaced intervals are supporting plates 24. Each supporting plate has connected thereto a line 25 which passes over and around a pulley 26 suspended from the ceiling 20. Each line 25 is connected to a common line 27 which passes over a pair of pulleys 28 and 29, also suspended from the ceiling, and is affixed at one end to motor 33 at one end of feed line 11. The other end of feed line 11 is supported through line 25' secured to plate 24' on hopper 10. Line 25' passes over and around pulley 26' suspended from the ceiling and is connected to line 27 in a manner similar to that of line 25. The other end of line 27 is tied to a winch 31, or the like, so as to enable the entire assembly to be lifted from a point relatively close to the floor to a point adjacent the ceiling. The advantages of such an arrangement which permits adjustment of the height of the feed pans and the clearing of the entire floor area should be readily apparent.

To distribute feed to the several feeding stations, feed line 11 supports therein an open center, axially expandable helical auger 32 which is driven at one end by a reversible motor 33 supported to the end of the feed line. Helical auger 32 is supported at opposite ends in a conventional manner by a bearing (not shown), while opposite ends of auger shaft extend through the closed ends of the feed line 11 for driving connection to the motor and the feed hopper assembly.

Advantageously, the driven end of the helical auger 32 is connected to a driving pulley 34 which drives pulley 35 secured to shaft 36 which is journaled in feed hopper 10. Driving connection is established by belt 37'. Shaft 36 is, in turn, connected to an agitator or stirrer (not shown) within the feed hopper 10 to facilitate mixing or agitation of the feed therein and distribution to the feed line 11. The feed hopper assembly may include a conventional one way clutch (not shown) between the helical auger 32 and the shaft of drive pulley 34 to preclude operation when the drive to the helical auger is reversed.

In operation, upon energization of the motor 33, the helical auger 32 is driven in a direction to cause feed from the feed hopper 10 to be conveyed along the feed line 11 to the several feeding stations. However, to prevent the feed from passing through the opening in the feed line at each feeding station, there is provided a valve cooperating with the auger, in a manner to be hereinafter described, which prevents distribution of feed to each feed station until the feed line contains a normal load, after which all feeding stations are filled simultaneously.

In accordance with the present invention, there is provided a feed sensing switch 37 positioned along the feed line trackway 23, preferably at a selected distance past a selected feeding station which may be the last feeding station, as at 38. Feed sensing switch 37 is a conventional micro-switch or mercury switch or any other type of a kick switch mounted between a pair of spaced plate members 39 and 40 adapted to ride on trackway 23, and is arranged to be actuated upon a build-up of feed in the feed line 11. To this end, switch 37 has its spring biased operating arm 41 bearing against a movable actuating plate 42 adapted to be raised by the level of feed in the feed line 11 when the section of the feed line under the actuating plate carries enough feed.

The feed sensing switch 37 is connected in the energizing control circuit for the motor 33 so that upon actuation of this switch, the motor 33 can be driven in a direction to reverse the direction of drive to the helical auger 32. Upon reversal of the direction of drive to the helical auger, each valve at each feeding station is actuated simultaneously to cause all feed pans 12 to receive feed.

The amount of feed which falls from each opening is equal to the amount which was carried by the helical auger 32 between that opening and the next upstream opening. Thus, not only is the feed delivered to the feed pans simultaneously, but it is delivered in equal amounts. Since the quantity of feed that a feed pan can hold and the amount of feed carried per length and feed line can be easily measured, the feeding stations are conveniently spaced along the feed line to prevent spill-over.

Figures 3, 4, 5:
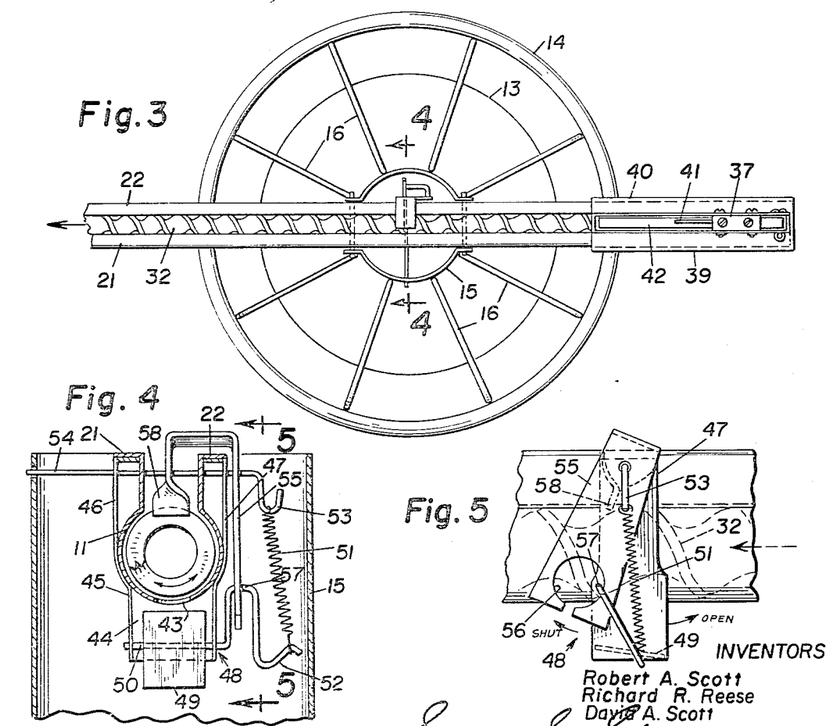
FIG. 3 is a plan view of the feed station illustrated in FIG. 2.
FIG. 4 is a view taken along lines 4—4 of FIG. 3 illustrating the feed valve in its open position.
FIG. 5 is a view taken along lines 5—5 of FIG. 4 illustrating the feed valve in its closed position.

Referring to FIGS. 4 and 5, there is illustrated one form of valve, suitable for use in the present invention for delivering feed to a feed station in response to a reversal of the direction of drive to the helical auger 32. As hereinbefore described, at each feeding station the feed line is provided with an opening 43 through which the feed drops into the feed pan suspended beneath the opening by feed guide 15. Interposed in the path of the feed is a chamber 44 formed by the inner walls of cylinder 45 supported to the feed line by extensions 46 and 47. The upper end of cylinder 45 is open to receive feed passing through the opening 43, while the lower end is maintained either in an opened or closed position by an auger actuated valve 48.

Valve 48 may be of the butterfly type comprising a plate 49 adapted to be swung between an open and a closed position. To this end, plate 49 is secured to rod 50 which extends through cylinder 45 and is biased closed by spring 51. One end of spring 51 is fastened to hook 52 formed at one end of rod 50, while the other end of spring 51 is fastened to another hook portion 53 formed at the end of rod 54 which is conveniently supported in suitable openings in extensions 46 and 47, feed line 11 and feed guide 15.

Actuation of valve 48 is effected through an actuating arm 55 pivotally supported on rod 54. The lower end of arm 55 is slotted as at 56 for engagement with a U-shaped portion 57 intermediate the ends of rod 50. The other end of actuating arm 55 is provided with a reverse bend and twisted at its extreme end to provide a flat end portion 58 which is positioned for engagement by the threads of the helical auger 32.

In operation, assuming that feed has just been distributed to the various feeding stations, etach of the valves 48 will be in their open position. As the motor 33 is energized, the helical auger 32 is driven to convey a fresh supply of feed the entire length of the feed line. The threads of the auger engage each of the flat ends 58 of each actuating arm 55 and cause the actuating arm to be swung in a clockwise direction thus closing each valve 48 as its plate 49 is swung to a horizontal position. It is also apparent from the disclosure that the invention contemplates a counter-clockwise motion of the arm 55 to achieve feed control if the mechanism is reversed. Some of the feed conveyed along the feed line drops into the closed chamber through each opening 43 until each chamber is filled and the remainder continues to be carried along the length of the feed line. The feed is conveyed past each feed station until a sufficient feed build-up occurs in the feed line which actuates switch 37 which is electrically connected to motor 33 so as to permit reversing the drive to the helical auger. This in turn causes the threads of the helical auger to engage the opposite side of the flat end portions 58 of each actuating arm 55 at each feeding station to swing the actuating arms in a counter-clockwise direction. This opens each chamber 44 simultaneously so that the feed begins to drop into the feed pans. It should be readily apparent that the amount of feed dropping through each chamber is equal to the amount which was carried by the helical auger between that feeding station and the next upstream station.

FIGS. 6–9 illustrate an alternate embodiment of a valve mechanism which is more economical in construction. In this embodiment, each opening 43 is covered with a flap 60 of flexible material which has one side attached adjacent the opening and to the undeside of the feed line 11 as at 61. The other side of the flap extends through the opening and into the feed line so as to close the opening. In this manner, when the helical auger 32 is driven in a direction to distribute feed to the several feeding stations, each of the openings 43 will be closed. When the auger is driven in a reverse direction, the flap 60 is caused to fold back upon itself thereby clearing the opening for distribution of feed.

Several forms of flexible material may be used for flap 60, it being only required that they readily fold back on themselves without cracking at the seam and that they be of sufficient rigidity so that they will not collapse into the opening under the weight of the feed when the flap is in a closed position. Flaps made from rubber sheathing produce excellent results. Preferably, the flaps should be cut with a bias as at 62 or pointed at the end positioned within the feed line. This facilitates lifting of the flap when the helical auger is driven in reverse direction. Once the tip of the flap is lifted, it engages the threads of the helical auger and is carried backwardly. Further, the force of the feed, some of which passes beneath the flap 60 as the helical auger is driven in the reverse direction, causes the flap to be displaced upwardly to be forced back upon itself by the motion of the auger.

Figure 6:
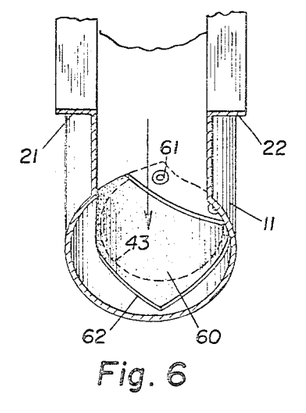
FIGS. 6 and 7 are perspective views, partly in cross-section, of an alternate embodiment for controlling the supply of feed to the feed pan.
Figure 7:
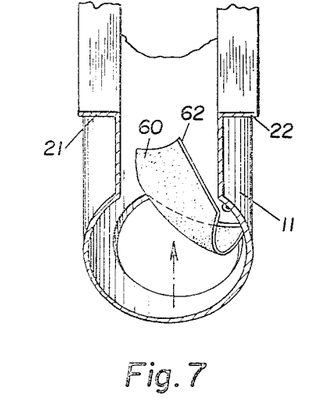
Figure 8:
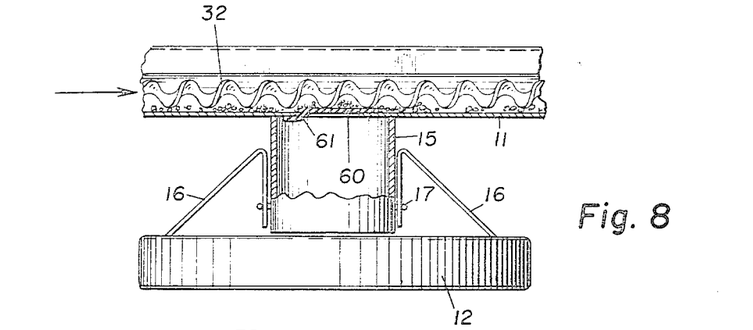
FIGS. 8 and 9 are fragmentary, side elevational views, partly in cross-section, illustrating the closed and open positions of the valve mechanisms shown in FIGS. 6 and 7.
Figure 9:
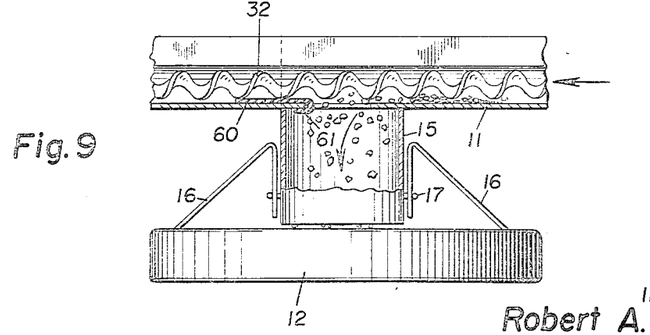

If it is desired to close off one or more openings 43, there may be provided at each feed station a manually slidable valve such as cover plate 43'. Cover plate 43' is mounted around the feed line 11 for sliding engagement therewith and is normally positioned adjacent an opening. To close off an opening, it is merely necessary to slide the cover plate so as to block the opening. In this manner, certain areas of the feeding house may be kept free of feed while routine cleaning or maintenance is performed.

Figure 10:
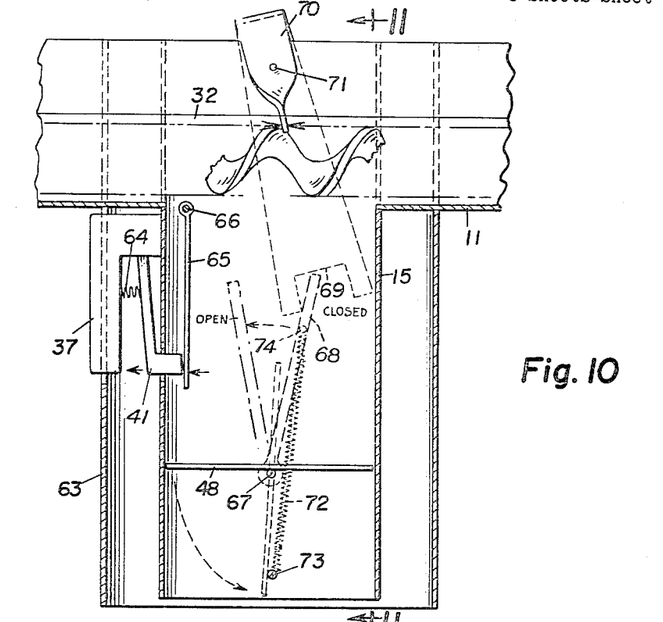
FIGS. 10 and 11 are fragmentary, side and front elevational views, respectively, partly in cross-section, of another embodiment for controlling the supply of feed to the feed pan.
Figure 11:
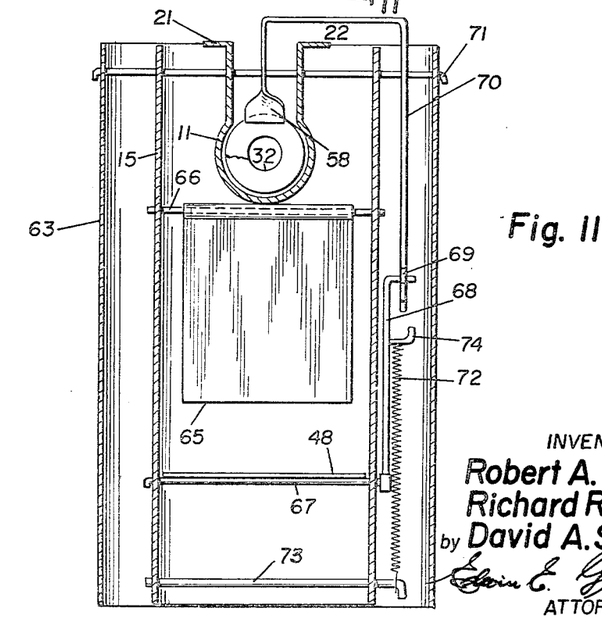

FIGS. 10 and 11 illustrate another arrangement wherein the feed sensing switch 37 is positioned within the feed guide of the last upstream feed station. Feed sensing switch 37 is supported to an outer shell 63 and its operating arm 41, biased by spring 64, extends through an opening provided in the feed guide 15 suspended within shell 63. Arm 41 contacts a feed limit actuating flap 65 which is pivotally supported on a rod chamber 66 or the like extending across the feed guide. Feed guide 15 is closed through the butterfly valve 48 which is secured to a shaft 67 adapted to be rotated by its upwardly extending actuating arm 68 having its free end disposed in slot 69 of actuating arm 70 pivotally supported on rod 71 and disposed for engagement with the helical auger 32 in the manner described with respect to actuating arm 55. Overtravel spring 72 is anchored at one end to a spring anchor 73, which also provides a stop for butterfly valve 48, and at its other end to pin 74 on arm 68.

In operation, as helical auger 32 is driven to distribute feed to the several feeding stations, actuating arm 70 is engaged by the threads of the helical auger to maintain valve 48 closed. This results in a feed build-up within the inner shell or feed guide 15. The build-up of feed causes actuating flap 64 to be pivoted outwardly in a clockwise direction thus actuating switch 37 and reversing the direction of drive to the auger which in turn swings the actuating arm 70 in the opposite direction to cause valve 48 to open. Thus, all feeding stations are filled simultaneously in response to a feed build-up within the feed guide 15 of the last feeding station.

Figure 12:
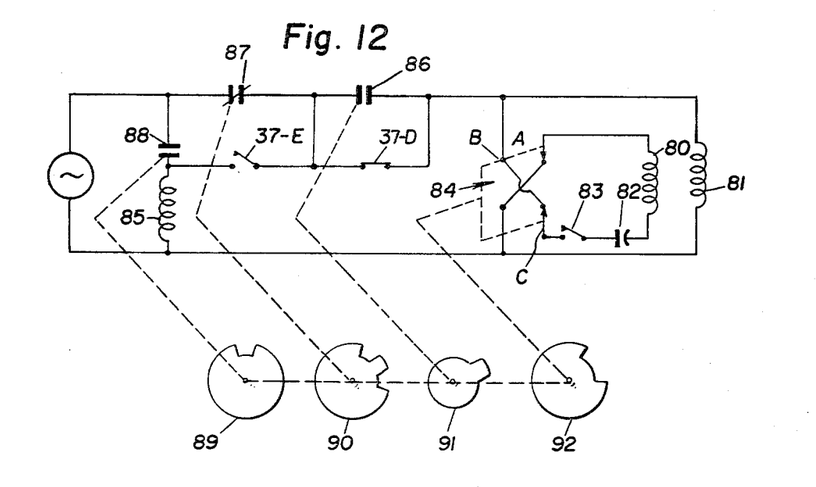
FIGS. 12 and 13 are diagrammatical illustrations of alternative arrangements of control circuits for energizing the poultry feeder of the present invention.
Figure 13:
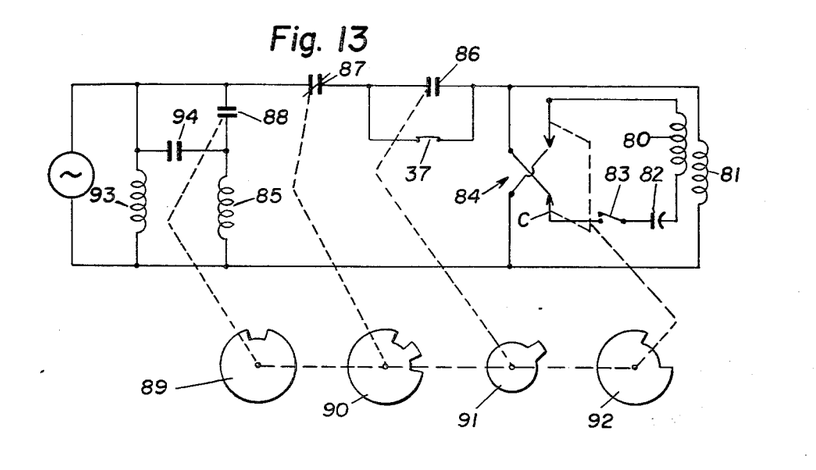

FIGS. 12 and 13 illustrate alternate forms of energizing circuits for the auger drive motor 33 and include a timer for providing automatic distribution of the feed to the feeding stations at predetermined intervals.

Referring to FIG. 12, the motor 33 for driving the helical auger is a conventional single phase A.C. capacitor start motor having a start winding 80 and run winding 81 and is connected to the helical auger through a conventional gear reduction unit. The start winding 80 is connected through capacitor 82 and a conventional speed kick-out start switch 83 across the forward-reverse contacts of switch 84. Reversal of drive to the helical auger is effected by reversing the phase excitation of the start winding 80 with relation to that of the running winding by switching the movable contacts C of switch 84 from position A to position B after the motor has been stopped. Switching of contact C is effected through a suitable cam driven by timer motor 85.

The run winding 82 of motor 33 is connected in series with cam actuated switch 86 shunted by the normally closed contacts D of feed-level switch 37 and through cam actuated switch 87 to the A.C. supply. The normally open contacts E of feed-level switch 37 are connected in series with the energizing winding of timer 85 and through switch 87 to the A.C. supply. Timer 85 may also be energized through its own cam actuated switch 88.

Timer 85 is a conventional timer having a preselected output of one revolution per 15 minutes and includes a plurality of cams 89–92 mounted to its shaft for actuation of switches 84, 86, 87 and 88 in a predetermined sequence. For clarity, the profile of cams 89–92 are illustrated in FIG. 12 and each of the corresponding switches actuated by each cam can be connected by dashed lines.

In operation, with timer 85 in its home position, motor 33 is energized through contacts 37D and switch 87 to run in a forward direction for conveying feed along feed line 11. Upon actuation of feed level switch 37, contacts 37D are opened while contacts 37E are closed thus energizing the timer and removing excitation to the motor. Cam 89 closes the energizing circuit to the motor to complete the cycle regardless of the state of the feed level switch 37. Cam 90 serves to open the motor circuit twice to avoid reversing from full speed, and cam 91 closes contacts 86 to assure that the motor will reverse regardless of the position of the feed level switch. Cam 92 operates switch 84 and causes the motor to reverse for a fixed period. Upon completion of the cycle, the timer returns to its home position and drive motor 33 is again energized to run in the forward direction until feed level switch 37 is again actuated, thus making the feeding process completely automatic.

FIG. 13 is an alternate energizing arrangement in which the motor may be energized in timed cycles to regulate the feeding periods. To this end, switch 37 is a normally closed single pole, single throw switch and a cycle initiate timer 93 is connected in series with the energizing winding of timer 85. The cycle initiate timer may be set for as many cycles as desired so long as the time interval between cycles is sufficient to allow the feed line to be filled completely and starts the cycles each time its contacts 94 close.

In another modified form of construction a wire 95 extends the full length of the feed line 11. Wire 95 is supported slightly above the feed line by plates 96 and 97 mounted at opposite ends and serves the purpose of preventing birds from roosting on the feed line. If desired, wire 95 may be supplied with a low electric voltage in a manner well known in the art in order to impart a mild electric shock to any birds attempting to roost on the feed lines or wire. Such an arrangement is particularly advantageous where the feed line is open at the top as shown in FIG. 1.

Figures 14, 15, 16:
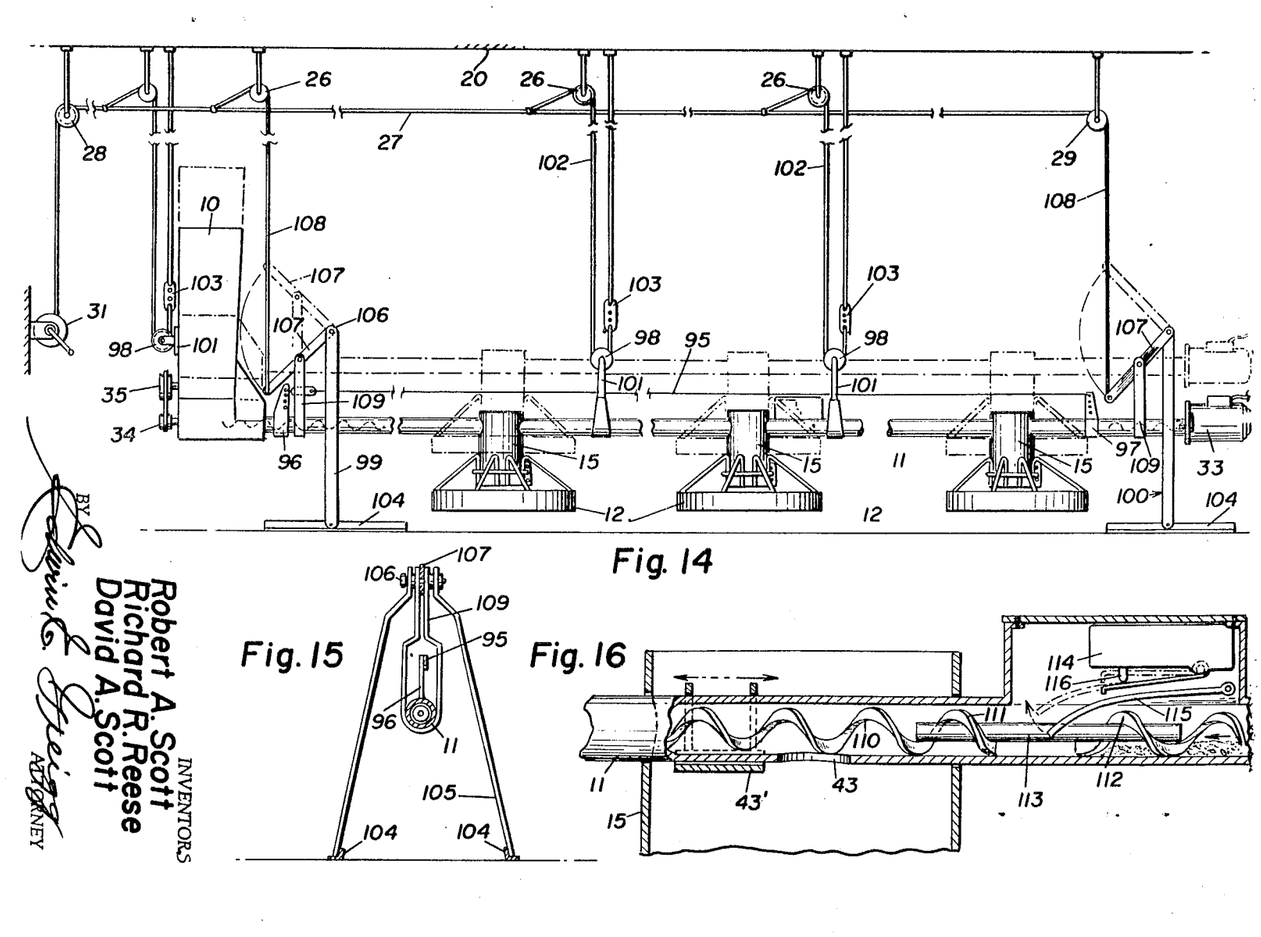
FIG. 14 is a side elevational view of an alternate embodiment of the present invention illustrating load dividing floor supports.
FIG. 15 is an elevational view, partly in cross-section, taken along lines 15—15 of FIG. 14.
FIG. 16 is a fragmentary, side elevational view, partially in cross-section, of an alternate embodiment of the present invention illustrating the separated thread auger arrangement for actuating a programming switch.

It should be apparent that the present invention is capable of a variety of modifications. For example, as shown in FIG. 14, feed line 11 may be formed from a closed pipe of circular cross-section. Such an arrangement avoids the problem of birds attempting to reach the feed from between the trackway 23.

In this form of the invention, feed sensing switch 37 is conveniently supported over a suitable opening (not shown) provided in the feed line to permit its actuating arm 41 to extend therein for actuation upon a build-up of feed in the feed line in the manner hereinbefore described.

Because the weight of the feed line is not uniform along its length, particularly at the ends where the motor 33 and feed hopper 10 are supported, there may advantageously be provided additional spaced support means on the floor which cooperate with the overhead supports to relieve a portion of the load at the heaviest places. To this end, as shown in FIG. 14, feed line 11 is provided with a plurality of pulleys 98 and floor supports 99 and 100 adapted, when the feed line is suspended in the adjustable area of operation, to divide the load. In this manner only one-half of the load is transferred to the master adjustment cable 27 and thus to the adjustment winch 31.

Pulleys 98 intermediate the ends of the feed line are rotatably supported above the feed line by frame members 101. An additional pulley 98 is provided on the feed hopper 10. This pulley is also rotatably supported by a fixed support 101 disposed on the side of the hopper. Support lines 102 extend downwardly from pulleys 26 and around pulleys 98 and are affixed at one end to the ceiling 20. Suitable adjustment plates or turnbuckles 103 may be provided in lines 102 for adjusting the tension in the lines. The other end of the lines are connected to the master adjustment cable 27 in the manner hereinbefore described.

Each of the floor supports 99 and 100 comprise a base member 104 and upwardly converging struts 105 joined by pin 106. Pivotally supported at one end on pin 106 is an arm 107 which is connected at its other end to a vertical line 108 leading to the master adjustment cable 27. Intermediate its ends, arm 107 is connected to a bracket 109 disposed about the feed line 11 to effect division of the load during height adjustment of the feed line as shown by the dotted lines of FIG. 14.

Figure 17:
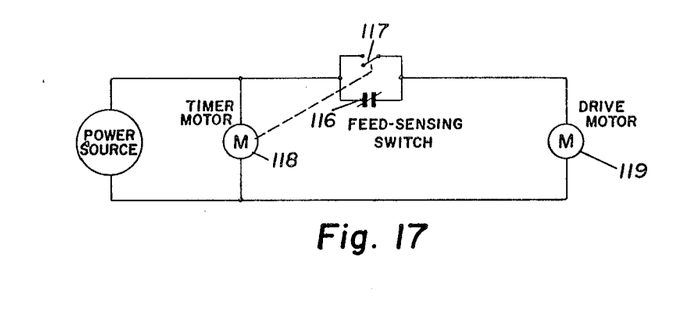
FIG. 17 is a diagrammatical schematic illustration of a control circuit for energizing the programming timer.

Referring to FIGS. 16 and 17, there is illustrated another embodiment of the present invention wherein the feeder may be programmed to run at desired intervals. In this embodiment, one revolution of auger 110 is broken away so that there is a discontinuity in the threads. Adjacent threads 111 and 112 at the point of discontinuity are connected by rod 113. A feed sensing micro-switch 114 is positioned preferably between the last and penultimate feed station with its pivoted sensing lever 115 disposed between threads 111 and 112 so as to actuate the switch contacts 116 upon a build-up of feed in the feed line. Feed sensing switch 114 has its contacts 116 connected electrically in parallel with contacts 117 of timer 118 which is, in turn, electrically connected across a power source. Both sets of contacts are connected in series with the power source and the main drive motor 119 so that the motor will be energized when either of the switch contacts is closed.

Timer 118 is a standard commercial item which can be adjusted to close the circuit at selected times during a 24 hour period and to hold it closed for any preselected time. A typical adjustment would be for the timer contacts to close every hour during the feeding period of the day and to remain closed for one minute.

In operation, with contacts 116 of the feed sensing switch closed, motor 119 is energized to drive the auger and cause the feed to be moved through the feed line to the several feeding stations. Motor 119 will remain energized until the feed tray at the penultinate feeding station is filled, after which a feed build-up will begin at the point of discontinuity in the auger threads. This feed build-up causes lever 112 to be pushed upwardly causing contacts 116 to open thus de-energizing the motor. The motor remains de-energized until the timer contacts 117 close to establish the circuit to the motor for the short preselected period. Any feed remaining between the last and penultimate feed station is discharged into the last feed tray. Likewise, if the other feed trays are not full, any feed left in the conveyor will be discharged into a tray prior to reaching the feed sensing switch. The feed sensing switch contacts will close and remain closed after timer contacts 117 open until such time as a feed build-up occurs to push lever 112 upwardly. In cases where no feed is consumed between the times when timer contacts 117 are closed, there will always be feed pushing on lever 112 and the motor will be de-energized promptly after a short time interval.

There is thus provided by the present invention an improved automatic poultry feeder for distributing equal quantities of feed to a plurality of feeding stations so as to provide fresh, clean feed of uniform mixtures to all feeding station along the length of the feed line. Although the invention has been described with reference to several variations, it will be readily apparent to those skilled in the art that various other modifications may be made without departing from the inventive concept.

What is claimed is:

1. A feeder comprising an elongated horizontally disposed feed line having a plurality of spaced openings defining a plurality of feeding stations, a supply hopper connected to said feed line, a helically threaded auger supported within said feed line, said helically threaded auger having a portion of its thread between two feeding stations broken away to provide a discontinuity therein, means for rigidly connecting the adjacent threads of said auger at the point of discontinuity, an electrical circuit including a power source and a motor for driving said auger to convey feed along said feed line and switch means in said circuit for energizing said motor, said switch means including an actuating arm disposed at said point of discontinuity for controlling the energization of said motor in response to the level of feed build-up at said point.

2. A feeder as set forth in claim 1, wherein said switch means includes a pair of contacts adapted to be actuated by said actuating arm, said motor and said contacts being serially connected to said power source, and a timer adapted to be energized from said power source and including a pair of contacts electrically in parallel with said switch contacts for programing the energization of said motor.

3. A feeder as set forth in claim 1 further including a manually slidable cover plate adjacent each opening in said feed line for closing off selected openings.

4. A feeder as set forth in claim 1 further including overhead means for vertically, adjustably suspending said feed line above a floor and floor supports spaced along said feed line and operatively connected to said overhead means for dividing the load during normal use 5. A feeder comprising an elongated horizontally disposed feed line having a plurality of spaced openings defining a plurality of feeding stations, a supply hopper connected to said feed line, a helically threaded auger supported within said feed line, said helically threaded auger having a portion of its thread between an end feeding station and a penultimate feeding station broken away to provide a discontinuity therein, means for rigidly connecting the adjacent threads of said auger at the point of discontinuity, an electrical circuit including a power source and a motor for driving said auger to convey feed along said feed line and switch means in said circuit for energizing said motor, said switch means including an actuating arm disposed at said point of discontinuity for controlling the energization of said motor in response to the level of feed build-up at said point.

6. A feeder as set forth in claim 5, wherein said switch means includes a pair of contacts adapted to be actuated by said actuating arm, said motor and said contacts being serially connected to said power source, and a timer adapted to be energized from said power source and including a pair of contacts electrically in parallel with said switch contacts for programming the energization of said motor.

References Cited

UNITED STATES PATENTS

| | | | |
|---|---|---|---|
| 3,074,534 | 1/1963 | Thiele | 198—66 |
| 3,180,318 | 4/1965 | Fisher | 119—56 |
| 3,184,109 | 5/1965 | Brackett | 222—56 X |
| 3,230,933 | 1/1966 | Myers et al. | 119—53 |
| 3,325,055 | 6/1967 | Marshall | 119—56 X |

HUGH R. CHAMBLEE, Primary Examiner

U.S. Cl. X.R.

119—52